United States Patent
Taneichi

(10) Patent No.: US 10,221,877 B2
(45) Date of Patent: Mar. 5, 2019

(54) NAIL

(71) Applicant: Kaoru Taneichi, Kanagawa (JP)

(72) Inventor: Kaoru Taneichi, Kanagawa (JP)

( * ) Notice: Subject to any disclaimer, the term of this patent is extended or adjusted under 35 U.S.C. 154(b) by 0 days.

(21) Appl. No.: 15/303,175

(22) PCT Filed: Apr. 9, 2014

(86) PCT No.: PCT/JP2014/002020
§ 371 (c)(1),
(2) Date: Oct. 10, 2016

(87) PCT Pub. No.: WO2015/155803
PCT Pub. Date: Oct. 15, 2015

(65) Prior Publication Data
US 2017/0030392 A1    Feb. 2, 2017

(51) Int. Cl.
*F16B 15/00* (2006.01)
*F16B 15/02* (2006.01)

(52) U.S. Cl.
CPC .............. *F16B 15/02* (2013.01); *F16B 15/00* (2013.01)

(58) Field of Classification Search
CPC ............................. F16B 15/00; F16B 15/0092
USPC ................................. 411/487, 493, 494–499
See application file for complete search history.

(56) References Cited

U.S. PATENT DOCUMENTS

| | | | | |
|---|---|---|---|---|
| 1,440,444 A * | 1/1923 | Boschke | ................... | E01B 9/06 238/366 |
| 1,542,281 A * | 6/1925 | Wendling | ................. | F16B 15/00 411/499 |
| 1,771,867 A * | 7/1930 | Stronach | ................. | F16B 15/00 411/499 |
| 1,921,514 A * | 8/1933 | Farrell | ..................... | F16B 15/06 411/493 |
| 2,044,740 A * | 6/1936 | Stronach | ................. | B21G 3/16 235/1 R |
| 3,218,136 A * | 11/1965 | Hogan | .................... | B21F 99/00 411/498 |
| 3,800,654 A * | 4/1974 | Larson | .................... | F16B 15/00 411/452 |
| 4,231,280 A * | 11/1980 | Gross | ...................... | F16B 15/04 29/432 |
| 4,233,880 A * | 11/1980 | Bjorklund | .............. | F16B 33/00 148/325 |

(Continued)

FOREIGN PATENT DOCUMENTS

| | | |
|---|---|---|
| JP | 2000-234607 A | 8/2000 |
| JP | 2003-097523 A | 4/2003 |

(Continued)

*Primary Examiner* — Flemming Saether

(74) *Attorney, Agent, or Firm* — Norris McLaughlin, P.A.

(57) ABSTRACT

A nail that is configured by: a nail main body composed of a soft iron material in which a head portion is formed in an upper end portion of a columnar body; and a tip end portion having a circular conical shape or a polygonal pyramidal shape that is formed in a lower end portion of the nail main body, in which the tip end portion is subjected to a tip end portion hardening treatment by quenching or plastic forging. The nail meets the Japanese Industrial Standards, is capable of being driven in a straight manner even when the tip end portion hits a hard knot, and is capable of being manufactured with relative ease.

2 Claims, 20 Drawing Sheets

(56) References Cited

U.S. PATENT DOCUMENTS

| | | | | |
|---|---|---|---|---|
| 5,755,542 | A * | 5/1998 | Janusz | C21D 9/0093 |
| | | | | 248/58 |
| 5,860,866 | A * | 1/1999 | Van Allman | F16B 19/14 |
| | | | | 163/6 |
| 6,086,305 | A * | 7/2000 | Lat | B21G 3/00 |
| | | | | 411/440 |
| 6,273,974 | B1 | 8/2001 | Lat et al. | |
| 6,338,600 | B2 * | 1/2002 | Friederich | C21D 6/02 |
| | | | | 411/386 |
| 7,014,409 | B2 * | 3/2006 | Allaart | F16B 15/0092 |
| | | | | 411/440 |
| 7,891,925 | B2 * | 2/2011 | Seigneur | B27B 33/14 |
| | | | | 411/501 |
| 2013/0142591 | A1 * | 6/2013 | Frank | F16B 19/086 |
| | | | | 411/386 |
| 2016/0186793 | A1 * | 6/2016 | Walworth | B21K 1/46 |
| | | | | 411/446 |

FOREIGN PATENT DOCUMENTS

| | | |
|---|---|---|
| JP | 2004-032912 A | 1/2004 |
| JP | 2006-153241 A | 6/2006 |
| JP | 2008-051153 A | 3/2008 |

\* cited by examiner

NAIL

BACKGROUND OF THE INVENTION

1. Field of the Invention

The present invention relates to a nail that is used, for example, to join lumber and the like.

2. Description of the Related Art

Related art includes Japanese Patent Laid-open Publication No. 2004-32912 and Japanese Patent Laid-open Publication No. 2003-97523.

Since the past, nails have been made of soft iron materials. A head portion is formed in an upper end portion of a columnar body. A circular conical or pyramidal tip end portion is formed in a lower end portion.

A nail that is formed in this manner can be smoothly driven into a piece of lumber in a section that has no knots, with the circular conical or pyramidal tip end portion. However, the nail has a disadvantage in that when the tip end portion hits a knotty portion, the nail is driven in a bent manner.

To solve this disadvantage, a following drive nail is considered. A lower end of the drive nail is formed into the shape of an inverted cone. A lower end of the inverted cone forms a planar tip end surface that is orthogonal to an axial line. A recessing cavity is formed in the center of the planar tip end surface such as to recess upward. A recessing groove wall is thereby maintained in the overall periphery of the recessing cavity. The drive nail meets the Japanese Industrial Standards. However, when this drive nail is used, there is a disadvantage in that, when the tip end portion hits a knot, the recessing groove wall in the overall periphery of the recessing cavity easily collapses because the drive nail is composed of a soft iron material to meet the Japanese Industrial Standards. The nail is driven in a bent manner. In addition, there is also a disadvantage in that work involved in forming the recessing groove wall in the overall periphery of the recessing cavity is painstaking and cost increases.

SUMMARY OF THE INVENTION

In light of conventional disadvantages such as those described above, an object of the present invention is to provide a nail that meets the Japanese Industrial Standards, is capable of being driven in a straight manner even when a tip end portion hits a hard knot, and is capable of being manufactured with relatively ease.

The description above, other objects, and novel features of the present invention will become more completely clear when the following description is read with reference to the accompanying drawings.

However, the drawings are mainly for description and do not limit the technical scope of the present invention. To achieve the above-described object, a nail is configured by: a nail main body composed of a soft iron material in which a head portion is formed in an upper end portion of a columnar body; and a tip end portion having a circular conical shape or a polygonal pyramidal shape that is formed in a lower end portion of the nail main body, in which the tip end portion is subjected to a tip end portion hardening treatment by quenching or plastic forging.

As is clear from the description above, the present invention achieves the effects listed below:

(1) According to a first aspect, a tip end portion is formed into a circular conical shape or a polygonal pyramidal shape, and is subjected to a tip end portion hardening treatment by quenching or plastic forging. Therefore, even when the tip end portion is driven into a section that has a hard knot, the nail can be driven straight, without bending.

Therefore, connection can be reliably performed.

(2) As a result of above-described (1), the tip end portion that is formed into a circular conical shape or a polygonal pyramidal shape is merely required to be subjected to a tip end portion hardening treatment by quenching or plastic forging. Therefore, compared to a nail in which a recessing groove wall is formed in an overall periphery of a recessing cavity such as that in the past, processing can be performed with relative ease.

(3) As a result of above-described (1), only the tip end portion is subjected to a tip end portion hardening treatment by quenching or plastic forging. Therefore, a product that meets the Japanese Industrial Standards can be manufactured.

(4) Effects similar to above-described (1) to (3) can also be achieved according to a second aspect.

DETAILED DESCRIPTION OF THE INVENTION

Figure 1:
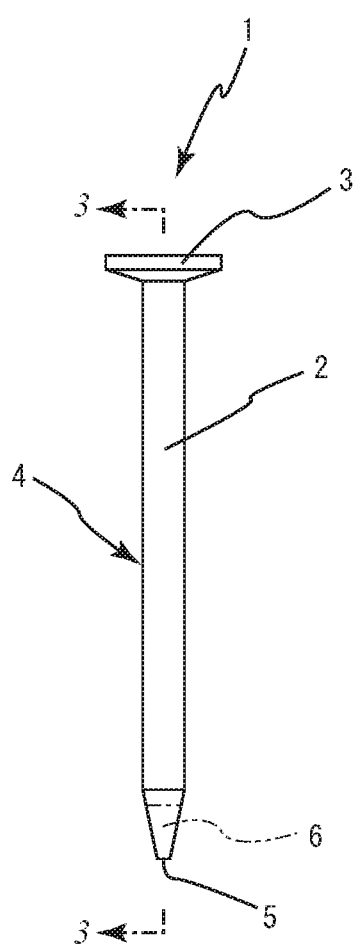
FIG. 1 is a front view according to a first embodiment for carrying out the present invention.
Figure 2:
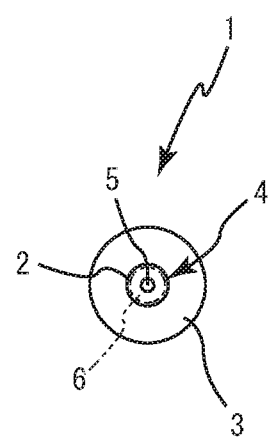
FIG. 2 is a bottom view according to the first embodiment for carrying out the present invention.
Figure 3:
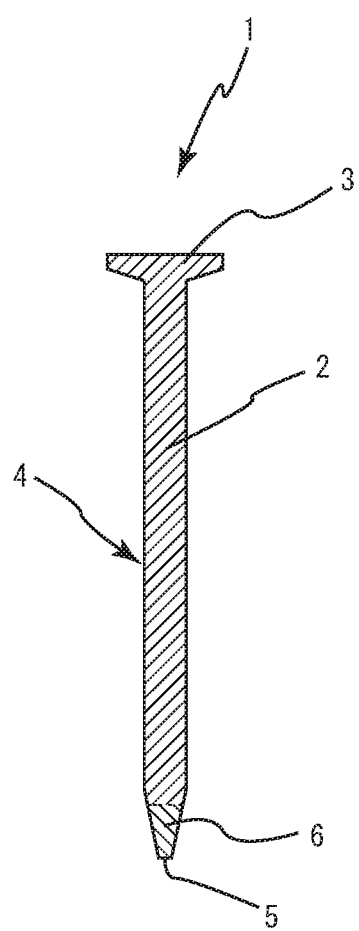
FIG. 3 is a cross-sectional view taken along line 3-3 in FIG. 1.

The present invention will be described in detail based on embodiments for carrying out the present invention shown in the drawings.

Figure 4:
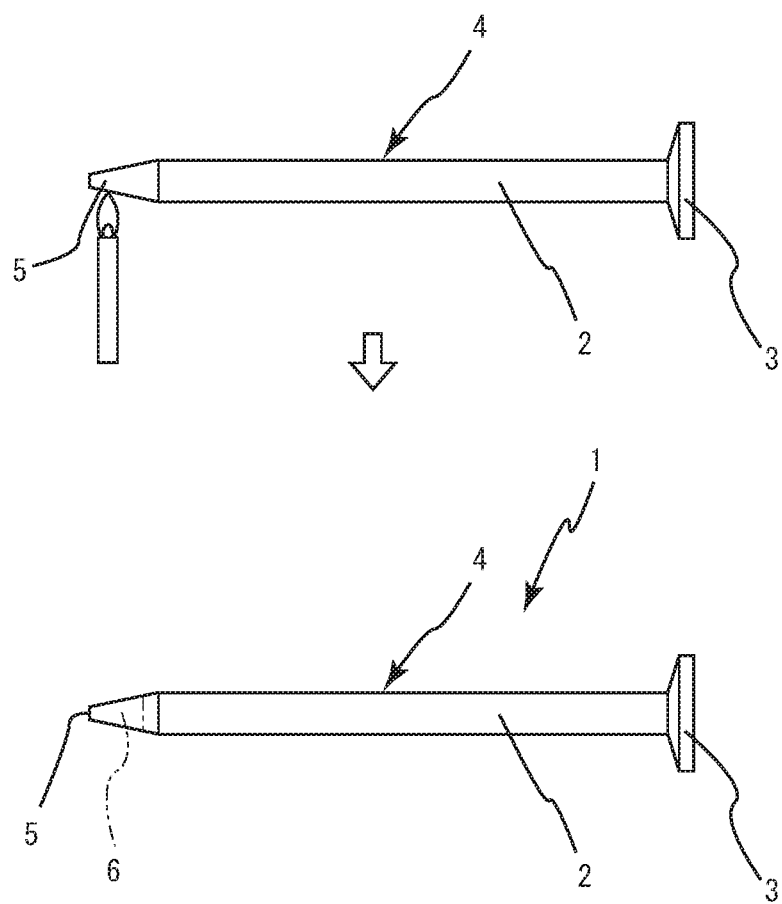
FIG. 4 is an explanatory diagram of a state in which a tip end portion hardening-treatment portion according to the first embodiment for carrying out the present invention is formed.

According to a first embodiment for carrying out the present invention shown in FIG. 1 to FIG. 5, reference number 1 represents a nail of the present invention that is composed of a soft iron material. The nail 1 is configured by a main nail body 4 and a tip end portion 5. In the main nail body 4, a head portion 3 is formed in an upper end portion of a cylindrical columnar body 2. The tip end portion 5 is formed in a lower end portion of the main nail body 4 and has a circular conical shape. As shown in FIG. 4, heat treatment by quenching is performed on the tip end portion 5, and a tip end portion hardening-treatment portion 6 is thereby formed.

Figure 5:
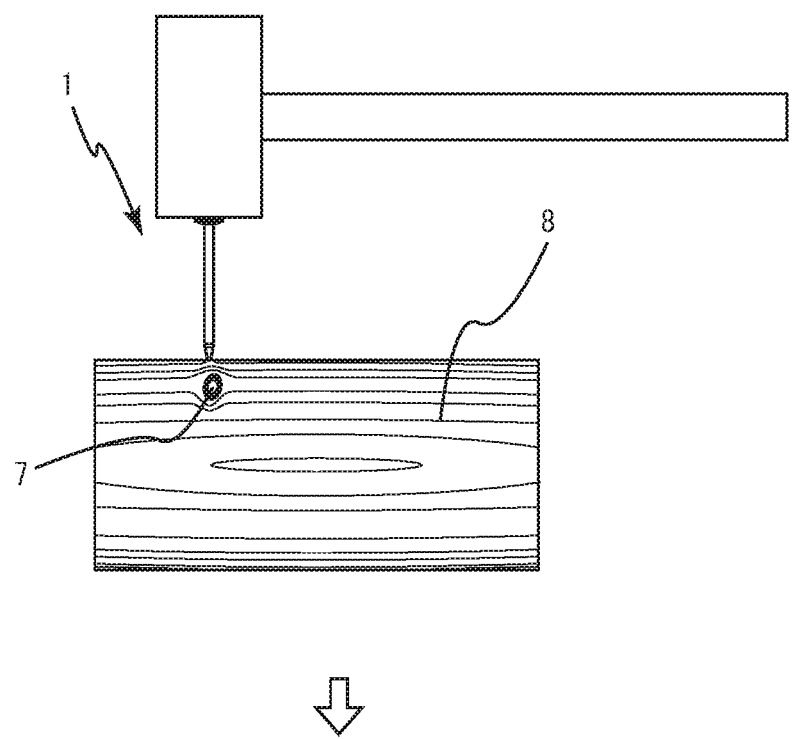
FIG. 5 is an explanatory diagram of a state of use according to the first embodiment for carrying out the present invention.
Figure 5:
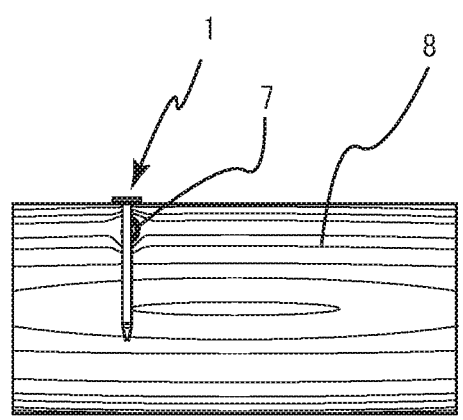

When the nail 1, configured as described above, is driven into a piece of lumber 8 at location where a knot 7 is present, the tip end portion 5 of the nail 1 can be easily driven to the location of the knot 7. In addition, even in the knot 7 portion, the tip end portion hardening-treatment portion 6 that has been hardened by quenching can be driven straight without drawing away from the knot 7, as shown in FIG. 5. Connection by the nail 1 can be reliably performed.

[Other Embodiments for Carrying Out the Invention]

Next, other embodiments for carrying out the preset invention, shown in FIG. 6 to FIG. 17, will be described. In the descriptions of the other embodiments for carrying out the present invention, constituent sections that are identical to those according to the above-described first embodiment for carrying out the present invention are given the same reference numbers. Redundant descriptions are omitted.

Figure 6:
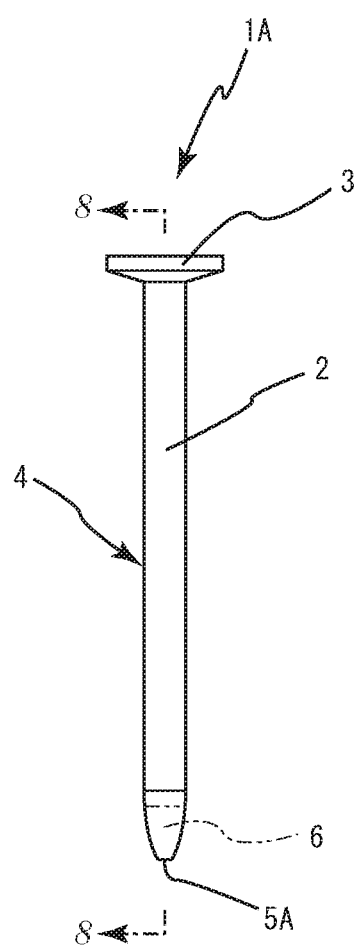
FIG. 6 is a front view according to a second embodiment for carrying out the present invention.
Figure 7:
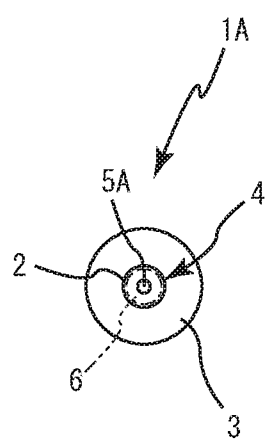
FIG. 7 is a bottom view according to the second embodiment for carrying out the present invention.
Figure 8:
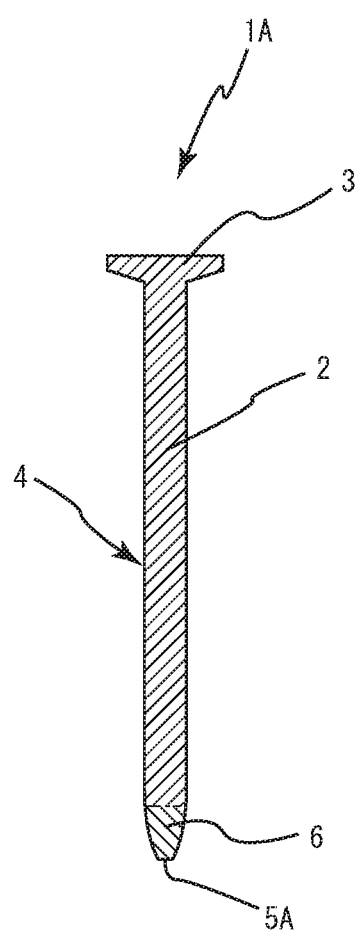
FIG. 8 is a cross-sectional view taken along line 8-8 in FIG. 6.

According to a second embodiment for carrying out the present invention, shown in FIG. 6 to FIG. 8, the main difference from the above-described first embodiment for carrying out the present invention is that a bombshell-shaped conical tip end portion 5A is formed in the lower end portion of the nail main body 4. The tip end portion 5A is shaped such that a tip end portion of a bombshell is horizontally fractured. Working effects similar to those according to the above-described first embodiment for carrying out the present invention can also be achieved by a nail 1A in which the tip end portion 5A is formed in this manner.

Figure 9:
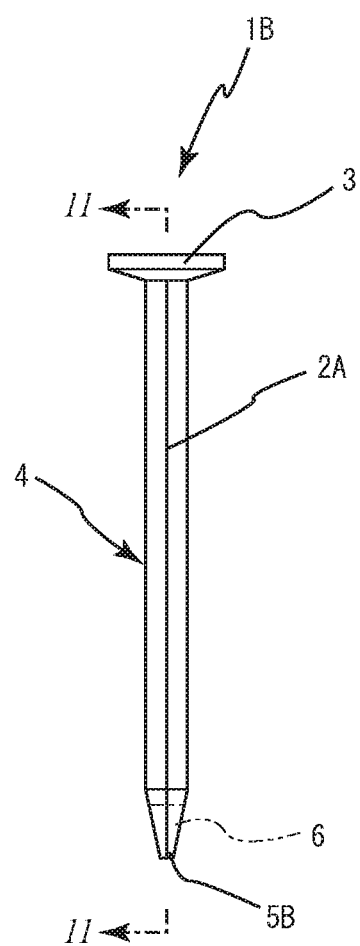
FIG. 9 is a front view according to a third embodiment for carrying out the present invention FIG. 10 a bottom view according to the third embodiment for carrying out the present invention.
Figure 10:
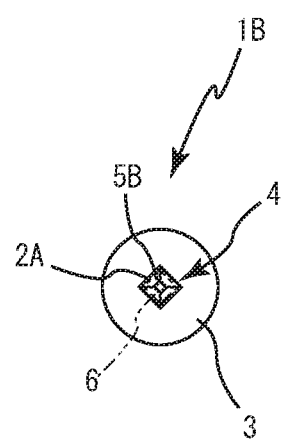
Figure 11:
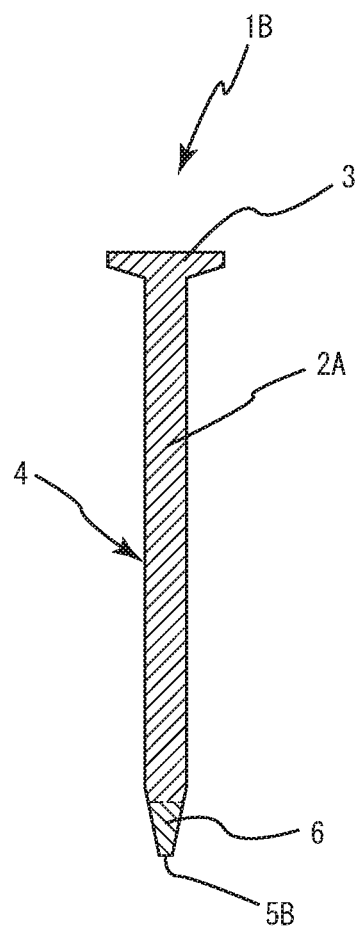
FIG. 11 is a cross-sectional view taken along line 11-11 in FIG. 9.

According to a third embodiment for carrying out the present invention, shown in FIG. 9 to FIG. 11, the main differences from the above-described first embodiment for carrying out the present invention are that a columnar body 2A is used and a tip end portion 5B is formed in a lower end portion. The columnar body 2A is formed into the shape of a rectangular column, as a polygonal column. The tip end portion 5B has a square pyramidal shape. Working effects similar to those according to the above-described first embodiment for carrying out the present invention can also be achieved by a nail 1B configured in this manner.

Figure 12:
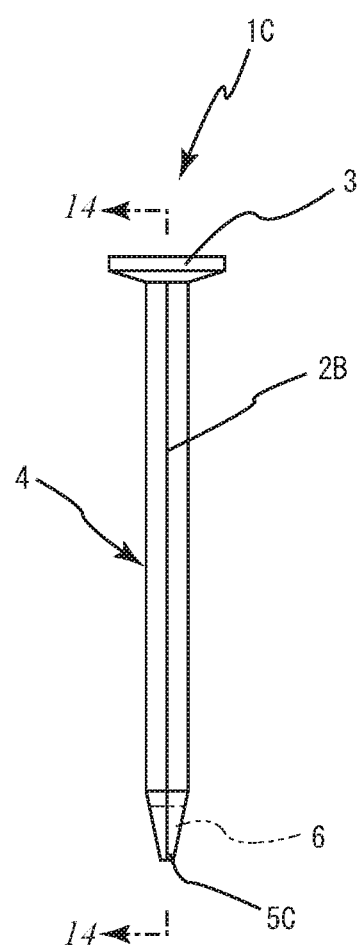
FIG. 12 is a front view according to a fourth embodiment for carrying out the present invention.
Figure 13:
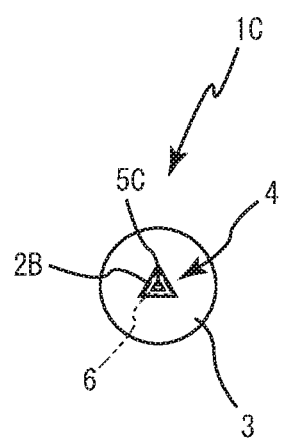
FIG. 13 a bottom view according to the fourth embodiment for carrying out the present invention.
Figure 14:
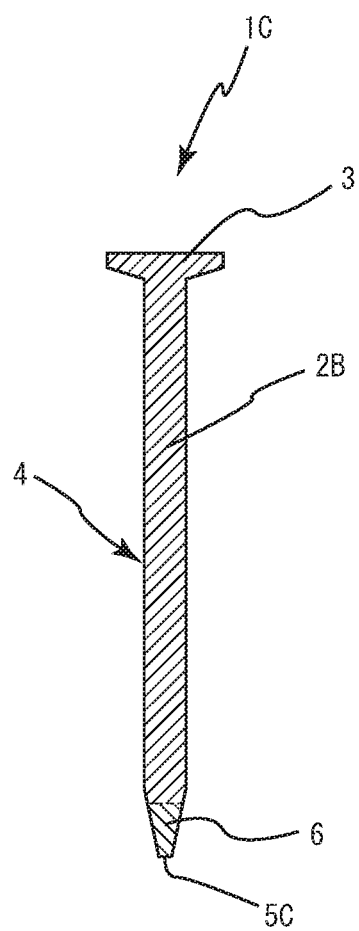
FIG. 14 is a cross-sectional view taken along line 14-14 in FIG. 12.

According to a fourth embodiment for carrying out the present invention, shown in FIG. 12 to FIG. 14, the main differences from the above-described first embodiment for carrying out the present invention are that a columnar body 2B is used and a tip end portion 5C is formed in a lower end portion. The columnar body 2B is formed into the shape of a triangular column, as a polygonal column. The tip end portion 5C has a triangular pyramidal shape. Working effects similar to those according to the above-described first embodiment for carrying out the present invention can also be achieved by a nail 1C configured in this manner.

Figure 15:
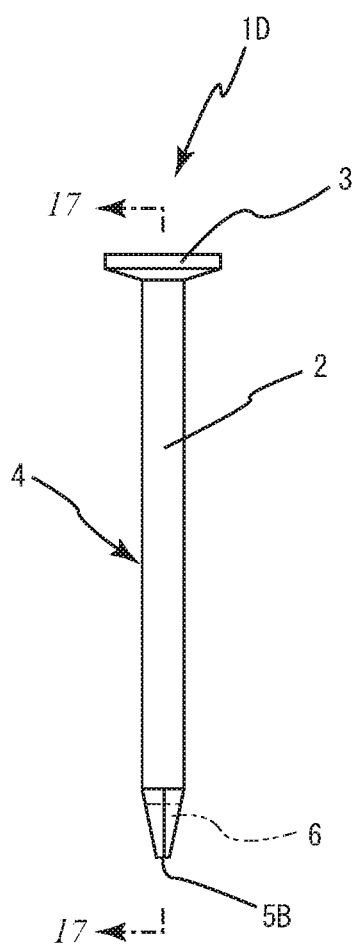
FIG. 15 is a front view according to a fifth embodiment for carrying out the present invention.
Figure 16:
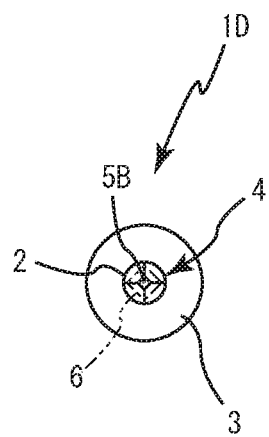
FIG. 16 a bottom view according to the fifth embodiment for carrying out the present invention.
Figure 17:
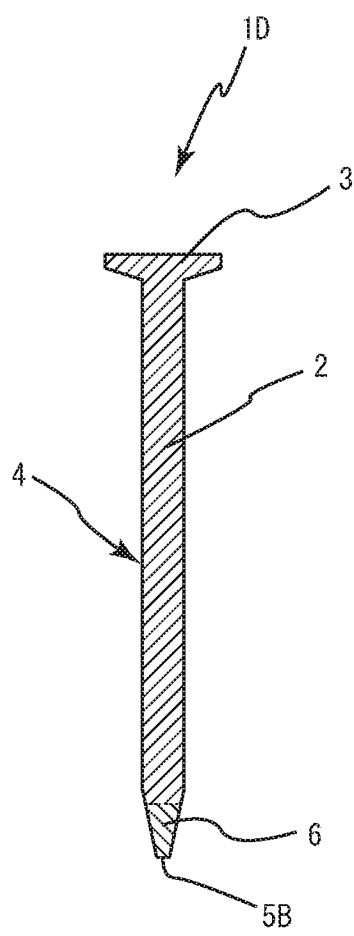
FIG. 17 is a cross-sectional view taken along line 17-17 in FIG. 15.

According to a fifth embodiment for carrying out the present invention, shown in FIG. 15 to FIG. 17, the main difference from the above-described first embodiment for carrying out the present invention is that the tip end portion 5B is formed in the lower end portion of the nail main body 4. The tip end portion 5B has a square pyramidal shape. Working effects similar to those according to the above-described first embodiment for carrying out the present invention can also be achieved by a nail 1D configured in this manner.

Figure 18:
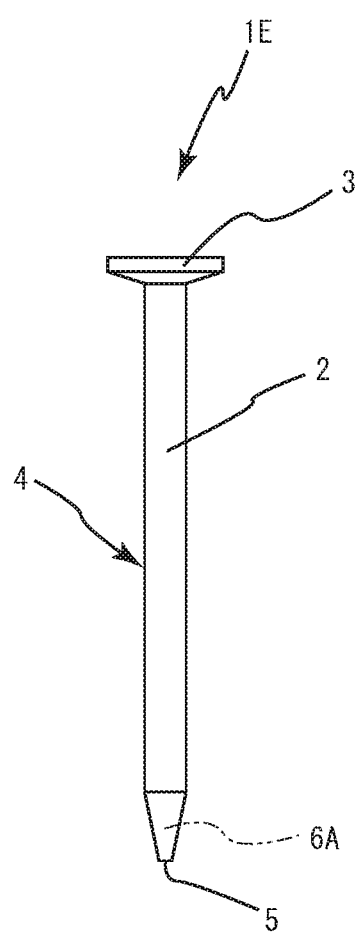
FIG. 18 is a front view according to a sixth embodiment for carrying out the present invention.
Figure 19:
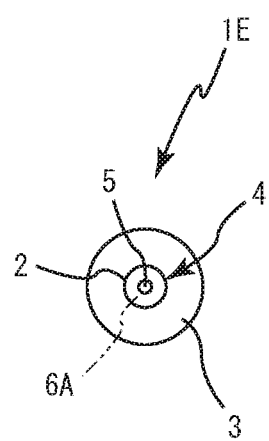
FIG. 19 a bottom view according to the sixth embodiment for carrying out the present invention.
Figure 20:
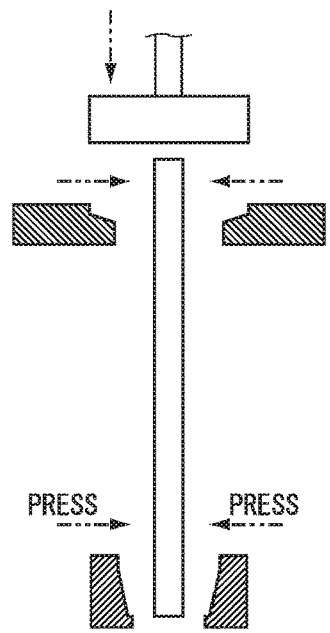
FIG. 20 is an explanatory diagram of a state in which a tip end portion hardening-treatment portion according to the sixth embodiment for carrying out the present invention is formed.
Figure 20:
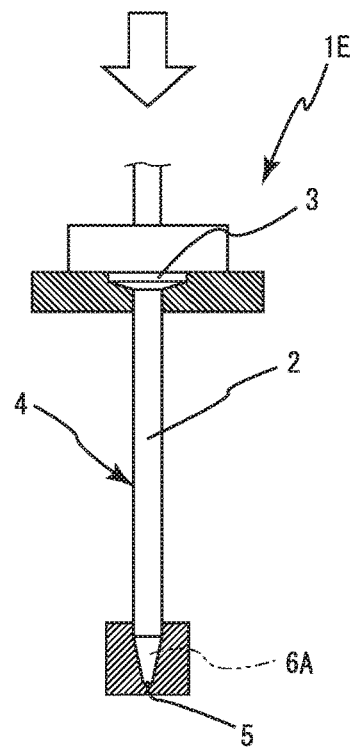

According to a sixth embodiment for carrying out the present invention, shown in FIG. 18 to FIG. 20, the main difference from the above-described first embodiment for carrying out the present invention is that the tip end portion 5 having the circular conical shape is formed into a tip end portion hardening-treatment portion 6A by plastic forging, as shown in FIG. 20. Working effects similar to those according to the above-described first embodiment for carrying out the present invention can also be achieved by a nail 1E in which the tip end portion hardening-treatment portion 6A is formed in this manner.

INDUSTRIAL APPLICABILITY

The present invention is used in an industry for manufacturing nails.

What is claimed is:

1. A nail comprising:
   a nail main body consisting of a soft iron material in which a head portion is formed in an upper end portion of a columnar body; and
   a tip end portion having a circular conical shape or a polygonal pyramidal shape or a bombshell-shaped conical shape formed in a lower end portion of the nail main body, wherein
   only part of the tip end portion is subjected to a hardening treatment, the soft iron nail not otherwise being subjected to a hardening treatment, and the hardening treatment is by quenching or plastic forging and wherein the tip end portion has only one end face and the end face of the tip end portion is at an extreme end of the tip end portion and consists of a flat surface in a single plane orthogonal to a lengthwise axis of the columnar body and extending continuously across the entire end face including an entire periphery of the end face where the end face meets side faces of the tip end portion and wherein all radial cross-sections of the columnar body are of a same shape and, except at the head portion and the tip end portion, are of a same size, and the part of the tip end portion subjected to the hardening treatment includes the end face and a part of the tip end portion contiguous with the circumference of the end face and excludes a part of the tip end portion contiguous with the circumference of the columnar body where the radial cross-sections of the columnar body are of the same shape and the same size.

2. The nail according to claim 1, wherein:
   the columnar body is formed into a shape of a circular column or a polygonal column; and
   the tip end portion formed into any of a circular conical shape, a bombshell-shaped conical shape, a triangular pyramidal shape, and a square pyramidal shape.

* * * * *